(12) United States Patent
Shimada et al.

(10) Patent No.: US 6,237,120 B1
(45) Date of Patent: May 22, 2001

(54) PROGRAM PATCHING OF A ROM

(75) Inventors: Keiichiro Shimada; Katsumi Matsuno; Sunao Furui, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/368,758

(22) Filed: Jan. 4, 1995

Related U.S. Application Data

(63) Continuation of application No. 07/882,268, filed on May 13, 1992.

(30) Foreign Application Priority Data

May 23, 1991 (JP) .................................................. 3-118799

(51) Int. Cl.[7] .................................................. G01R 31/28

(52) U.S. Cl. .......................... 714/726; 714/733; 714/734; 714/742

(58) Field of Search .................................. 371/10.2, 11.1, 371/11.3, 25.1, 40.1, 67.1; 395/182.06, 182.03; 714/726, 733–34, 742

(56) References Cited

U.S. PATENT DOCUMENTS

| 4,028,678 | 6/1977 | Moran . |
| 4,028,679 | 6/1977 | Divine . |
| 4,028,683 | 6/1977 | Divine et al. ..................... 340/172.5 |
| 4,028,684 | 6/1977 | Divine et al. . |
| 4,051,460 | 9/1977 | Yamada et al. . |
| 4,095,278 | 6/1978 | Kihara . |
| 4,150,428 | 4/1979 | Inrig et al. . |
| 4,218,757 | 8/1980 | Drogichen . |
| 4,291,375 | 9/1981 | Wolf ..................................... 364/483 |

(List continued on next page.)

FOREIGN PATENT DOCUMENTS

| 0 263 447 A2 | 4/1988 | (EP) | ................................. G06F/9/30 |
| 0 428 005 A2 | 5/1991 | (EP) | ................................. G06F/9/26 |
| 0 458 559 A2 | 11/1991 | (EP) | ................................. G06F/11/00 |
| 8101113499 | * 7/1981 | (JP) . |
| 007067 | * 3/1983 | (JP) | ................................. G06F/11/28 |
| 62-249231 | 10/1987 | (JP) | ................................. G06G/9/22 |
| 1-065633 | 3/1989 | (JP) | ................................. G06G/9/22 |
| 1-099129 | 4/1989 | (JP) | ................................. G06F/9/22 |
| 1-114941 | 5/1989 | (JP) | ................................. G06G/9/22 |

OTHER PUBLICATIONS

Rosenberg, J.M.; Dictionary of Computers, Information Processing & Telecommunications, 2 ed. pp. 94, 239, 292, 301, 327, 382, 394, and 613, 1984.*

D. P. Siewiorek et al., Computer Structures: Principles and Examples, 1982, McGraw–Hill, pp. 581, and 612–614.*

(List continued on next page.)

Primary Examiner—Norman Michael Wright
(74) Attorney, Agent, or Firm—Oblon, Spivak, McClelland, Maier & Neustadt, P.C.

(57) ABSTRACT

A micro-controller integrated on a single substrate and which includes a read-only information memory for storing firmware, an address controller for performing address control, and an input port for inputting information supplied thereto from a source external to the substrate further incorporates a correcting information storage memory for receiving correcting information input thereto from the source external to the substrate through the input port and storing the correcting information upon an initialization of the micro-controller, wherein the correcting information is indicative of a modification for a defective information part stored in the read-only information storage memory, and a switching circuit for selectively switching the access by the address controller from the defective information part in the read-only information storage memory to the correcting information in the correcting information storage memory.

1 Claim, 11 Drawing Sheets

U.S. PATENT DOCUMENTS

| | | | |
|---|---|---|---|
| 4,296,470 | 10/1981 | Fairchild et al. | 364/200 |
| 4,319,343 | 3/1982 | Powell | 365/189 |
| 4,400,798 | 8/1983 | Francis et al. | 365/174 |
| 4,424,574 | 1/1984 | Enoki et al. | 364/900 |
| 4,490,783 | 12/1984 | McDonough et al. | 364/200 |
| 4,490,812 | 12/1984 | Guterman | 364/900 |
| 4,517,643 | 5/1985 | Bannai | 364/200 |
| 4,542,453 * | 9/1985 | Patrick et al. | 364/200 |
| 4,610,000 | 9/1986 | Lee | 365/189 |
| 4,620,273 | 10/1986 | Mitani et al. | 364/136 |
| 4,709,324 | 11/1987 | Kloker | 364/200 |
| 4,727,476 | 2/1988 | Rouchon | 364/200 |
| 4,745,572 | 5/1988 | Wilburn | 364/900 |
| 4,751,677 | 6/1988 | Hirayama et al. | 364/200 |
| 4,751,703 | 6/1988 | Picon et al. | 371/10 |
| 4,769,767 | 9/1988 | Hilbrink | 364/200 |
| 4,802,119 * | 1/1989 | Heene et al. | 364/900 |
| 4,819,154 | 4/1989 | Stiffler et al. | 364/400 |
| 4,831,517 | 5/1989 | Crouse et al. | 364/200 |
| 4,905,200 | 2/1990 | Pidsosny et al. | 364/300 |
| 4,942,541 | 7/1990 | Hoel et al. | 364/519 |
| 4,972,481 | 11/1990 | Santesson | 380/49 |
| 5,051,897 * | 9/1991 | Yamaguchi et al. | 364/200 |
| 5,063,499 | 11/1991 | Garber | 395/500 |
| 5,077,737 | 12/1991 | Leger | 371/10.1 |
| 5,199,032 | 3/1993 | Sparks et al. | 371/3 |
| 5,214,771 | 5/1993 | Clara et al. | 395/500 |
| 5,289,416 | 2/1994 | Iwai | 365/200 |
| 5,305,460 | 4/1994 | Kaneko et al. | 395/775 |
| 5,357,627 | 10/1994 | Miyazawa | 395/575 |
| 5,408,672 | 4/1995 | Miyazawa et al. | 395/800 |
| 5,454,100 * | 9/1995 | Sagane | 395/182.06 |
| 4,456,966 | 6/1984 | Bringol et al. | |

OTHER PUBLICATIONS

*Computer Structures: Principles and Examples*, McGraw–Hill Publishing Company, copyright 1982,, Daniel P. Siewiorek et al., pp. 581, 612–614.

U.S. application No. 08/110,818, Yamamoto et al., filed Aug. 23, 1993.

U.S. application No. 08/001,311, Shimada et al., filed Jan. 6, 1993.

U.S. application No. 08/004,932, Yamamoto et al., filed Jan. 15, 1993.

U.S. application No. 08/122,904, Yamamoto et al., filed, Sep. 16, 1992

Short and Long ROS Patch, H. Trinh IBM Technical Disclosure Bulletin—vol. 24, No. 3—Aug. 1981 pp 1379–1382.

Charlie Meleaur: "Applications for Microcomputers with $E_2PROM$" Electro/ 86 and Mini/Micro Northeast 11(1986), Conference Record, Los Angeles, CA, USA, pp. 1–9.

IBM Technical Disclosure Bulletin, vol. 26 No. 10B, Mar. 1984, New York, USA, pp. 2–3, L. Weiss: "Path Microcode Change Level Check".

IBM Technical Disclosure Bulletin, vol. 30, No. 5, Oct. 1987, "On–Site ROS Patch Mechanism" pp. 4–5.

IBM Technical Disclosure Bulletin, vol. 31, No. 1, Jun. 1988, "Dual Indirect RAM/ROM Jump Tables for Firmware Updates" pp. 294–289.

Patent Abstracts of Japan, vol. 7, No. 67 (P–184), Mar. 19, 1983 & JP–A–57 211 651 (Tokyo Shibaura Denki KK), Dec. 25, 1982.

Patent Abstracts of Japan, vol. 7, No. 90 (P–191), Apr. 14, 1983 & JP–A–58 016 350 (Tokyo Shibaura KK), Jan. 31, 1983.

Patent Abstracts of Japan, vol. 14, No. 64 (P–1002), Feb. 6, 1990 & JP–A–01 286 029 (Sugawa Kazuyuki), Nov. 17, 1989.

* cited by examiner

Execution Image or Reference Image

| Address | Data |
|---|---|
| A | a |
| B | b |
| C | c |
| D | d |
| E | k (Correcting Content) |
| F | f |
| G | g |
| H | h |

Correcting Address Register 31: E

Correcting Data Register 32: k (Correcting Content)

ROM 15

| Address | Data |
|---|---|
| A | a |
| B | b |
| C | c |
| D | d |
| E | e (Erroneous Portion) |
| F | f |
| G | g |
| H | h |

FIG. 8A

ROM 15

| Address | Data |
|---|---|
| A | a |
| B | b (Erroneous Portion) |
| C | c |
| D | d |
| E | e (Erroneous Portion) |
| F | f |
| G | g |

Correcting Address Register 31: 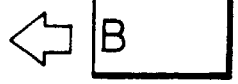 B

Correcting Data Register 32: Jump to "L"

Correcting Address:  E

Correcting Data: Jump to "P"

FIG. 8B

RAM 26

| Address | Data |
|---|---|
| L | Correcting content of "B" |
| M | Write leading address E of the next correcting portion in correcting address register (31) |
| N | Write instruction indicative of "Jump to P" in correcting data register (32) |
| O | Jump to "C" |
| P | Correcting content of "E" |
| Q | Write leading address B of the next correcting portion in correcting address register (31) |
| R | Write instruction indicative of "Jump to L" in correcting data register (32) |
| S | Jump to "F" |

FIG. 8C

Execution Image
Address | Data

| A | a |
| B | Jump to "L" |

| L | Correcting content of "B" |
| M | Set the next correcting conditions |
| N | |
| O | Jump to "C" |

| C | c |
| D | d |
| E | Jump to "P" |

| P | Correcting content of "E" |
| Q | Set the next correcting conditions |
| R | |
| S | Jump to "F" |

| F | f |
| G | g |

PROGRAM PATCHING OF A ROM

This is a continuation of co-pending application Ser. No. 07/882,268 filed on MAY 13, 1992.

BACKGROUND OF THE INVENTION

1. Field of the Invention

The present invention relates generally to electronics apparatus such as exclusive-use micro-controllers and, more particularly to an electronics apparatus in which a central processing unit (CPU) provided as an address controller or the like and a read-only memory (ROM) in which programs and data are stored in a fixed condition are integrated as one chip.

2. Description of the Related Art

Conventional electronics apparatus such as a video cassette recorder (VCR) having a built-in camera, for example, have mounted thereon a custom LSI (large scale integration) integrated electronics apparatus on one chip as control means, i.e., a so-called micro-controller for controlling the entirety or part of the electronics apparatus.

The micro-controller is an exclusive-use microcomputer which is composed of a central processing unit (CPU), a memory such as a read-only memory (ROM) and a random access memory (RAM) and a peripheral circuit such as an input/output (I/O) port or the like.

The CPU acts as an address controller to control the access to the memories or the like or acts as a processor to execute a program. Information such as programs, data and so on for controlling the mounted electronics device are stored in the ROM in the form of firmware. The RAM provides the CPU with a working area or the like to execute a program and the peripheral circuit is used to communicate with the external circuits. Accordingly, mass-production is indispensable for providing inexpensive custom LSI electronics apparatus such as micro-controllers or the like.

The firmware capacity stored in the ROM of the micro-controller is increased yearly as the performance of the electronics apparatus is enhanced and refined. Considering a VCR having a built-in camera, for example, the above-mentioned capacity is expected to exceed the present capacity of several 10s of kilobytes and to exceed 100k bytes after a few years.

The largest efforts are made to improve on the quality of the firmware by structured programming and various inspections so as to prevent bugs from taking place in the firmware after the micro-controller is mass-produced. Even when a bug is discovered after the micro-controller is mass-produced, a lot of money, plenty of time and people are needed to cope with the bugs by some suitable means such as correcting the firmware by the addition of an external circuit or the like and by mass-producing and exchanging a micro-controller in which a bug patch is carried out. However, in the case of electronics apparatus such as the built-in camera type VCR which uses assembly parts of high accuracy, a bug patch by the addition of an external circuit becomes substantially impossible.

OBJECTS AND SUMMARY OF THE INVENTION

Therefore, it is an object of the present invention to provide an improved electronics apparatus in which the aforementioned shortcomings and disadvantages encountered with the prior art can be eliminated.

More specifically, it is an object of the present invention to provide an electronics apparatus in which even when a bug in the firmware is discovered after the electronics apparatus is mass-produced or even when the firmware must be modified, such problems can be solved readily and easily by supplying in one step a correcting information thereto from the outside.

Another object of the present invention is to provide an electronics apparatus in which a countermeasure requiring much money, time and people such as the addition of external circuits, another mass-production of electronics apparatus or the like can be made unnecessary.

A further object of the present invention is to provide an electronics apparatus which can be prevented from being lowered in reliability by the addition of an external circuit or the like.

As an aspect of the present invention, an electronics apparatus integrated on a single substrate and in which a read-only information storage means for storing firmware, address control means for performing address control, and input means for inputting information supplied thereto from an external source comprise correcting information storage means for receiving correcting information input thereto from the external source through the input means and storing the correcting information, wherein the correcting information is indicative of a modification for a defective information part stored in the read-only information storage means, and switching means for selectively switching the access by the address control means from the defective information part in the read-only information storage means to the correcting information in the correcting information storage means.

BRIEF DESCRIPTION OF THE DRAWINGS

A better understanding of other objects, features, and advantages of the present invention can be gained from a consideration of the following detailed description of illustrative embodiments thereof, in conjunction with the figures of the accompanying drawings, in which:

FIGS. 8A, 8B and 8C are schematic diagrams used to explain a further example of the operation of the second embodiment shown in FIG. 4.

DETAILED DESCRIPTION OF THE PREFERRED EMBODIMENTS

The present invention will now be described with reference to the drawings.

Figure 1:
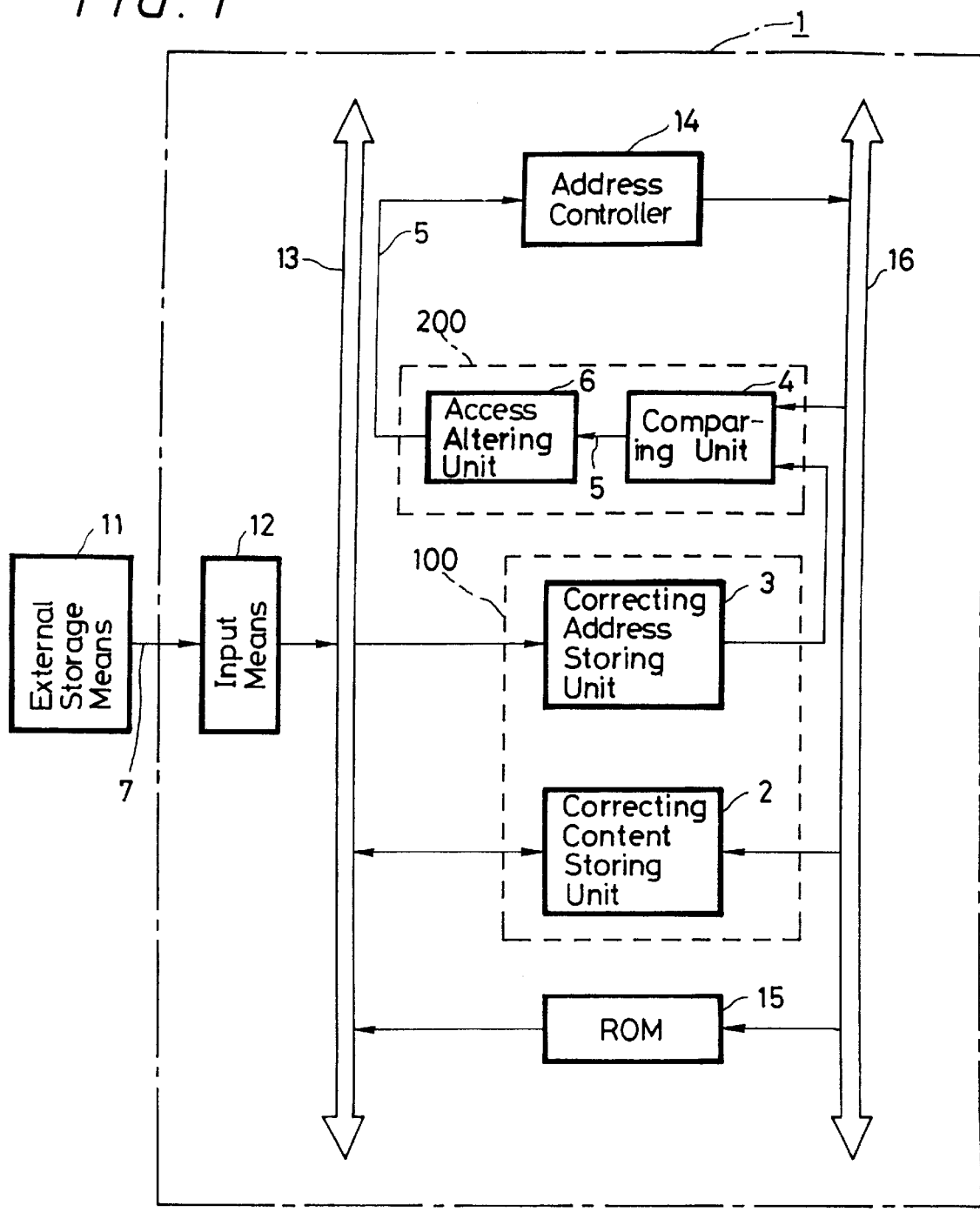
FIG. 1 is a block diagram showing a fundamental arrangement of the present invention.

Referring to FIG. 1, an electronics apparatus 1 of the present invention has an architecture in which a correcting information storing means 100, composed of a correcting content storing unit 2 and a correcting address storing unit 3, and a switching means 200, composed of a comparing unit 4 and an access altering unit 6, are added to a conventional micro-controller which includes input means 12, an 8-bit data bus 13, an address bus 16, a ROM 15, and an address controller 14. A patch when a bug or a portion to be corrected (hereinafter, referred to as a defective portion) occurs in the firmware stored within a ROM 15 is executed as follows:

First, the input of a correcting information 7 will be described. The correcting information 7 is composed of an address of a defective portion stored in the ROM 15, i.e. a start address (hereinafter, referred to as a correcting address) and a content to be patched to the defective portion, including an address, (hereinafter referred to as a correcting content) in the ROM to be restored after the patch. The correcting address and the correcting content are written in the correcting address storage unit 3 and the correcting content storage unit 2, respectively, of the correcting information storage means 100 from an external storage means 11 through the input means and the data bus 13.

The writing of the correcting information 7 into the correcting information storage means 100 is carried out by a loader within the ROM 15 when the electronics apparatus 1, for example, is initialized. While the external storage means 11 is provided outside the electronics apparatus 1 in FIG. 1, it might be provided within the electronics apparatus 1. In order to latch the correcting address, the correcting address storage unit 3 is a 16-bit register, for example, and delivers its output to the comparing unit 4 of the switching means 200, while the correcting content storage unit 2 is a RAM which temporarily stores therein the correcting content.

The patching of the defective portion in the ROM 15 will be described below. The address controller 14, e.g. a CPU controls the address of the ROM 15 through the address bus 16. When the address controller 14 reaches the correcting address of the defective portion, two addresses input to the comparing unit 4, i.e., an execution address from the address bus 14 and a correcting address from the correcting address storing unit 3, become equal and hence the comparing unit 4 outputs an address coincidence signal 5 to the access altering unit 6. The access altering unit 6 sends information to the address controller 14 to cause the address control to address the correcting content storage unit 2 instead of the ROM 15.

After the correcting content stored in the correcting content storage section 2 is executed, the address control of the address controller 14 is returned to the address at which the defective portion in the ROM 15 designated by the correcting content is skipped. As described above, the patching of the defective portion of the firmware stored in the ROM 15 in a fixed manner is carried out. The access altering unit 6 corresponds to an interruption control circuit or the like.

Figure 2:
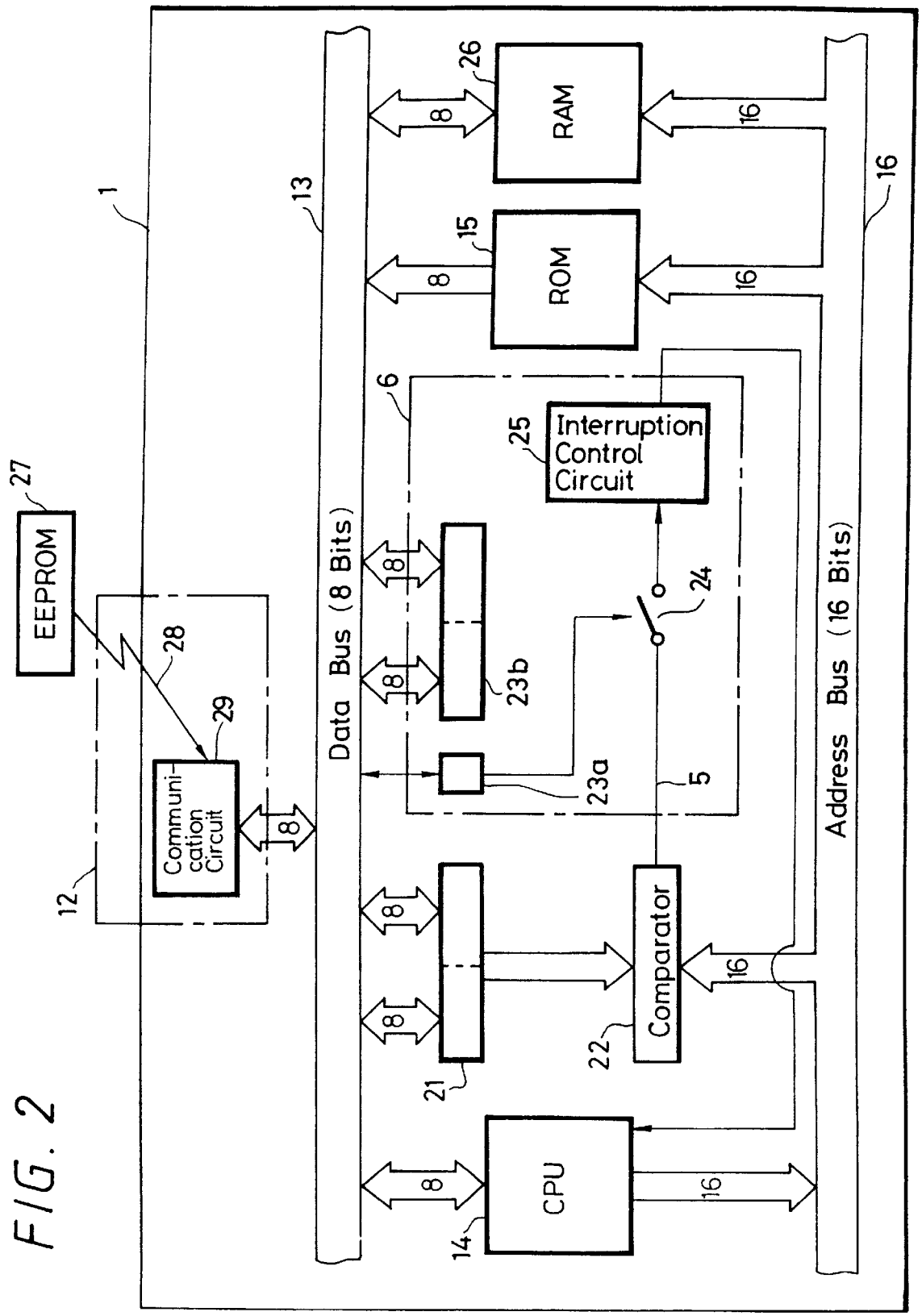
FIG. 2 is a block diagram showing an electronics apparatus according to a first embodiment of the present invention.

FIG. 2 of the accompanying drawings shows in block form an embodiment of the present invention. This embodiment is applied to the case such that a program on the ROM 15 is a target of the patching. In FIG. 2, the same or like blocks in FIG. 1 are marked with the same references and therefore need not be described.

The correcting information stored in an electrically erasable and programmable read-only memory (EEPROM) 27 is written in a 16-bit interruption generating address register 21 and a RAM 26 through a communication line 28, a communication circuit 29 and the 8-bit data bus 13. In FIG. 2, the EEPROM 27 corresponds to the external storage means 11 in FIG. 1 and the communication line 28 and the communication circuit 29 correspond to the input means 12 in FIG. 1. A part of the RAM 26 is used as the correcting content storage unit 2 of FIG. 1 in which the correcting content is written. Further, the interruption generating address register 21 corresponds to the correcting address storage unit 3 to which the correcting address is latched.

A 16-bit comparator 22, corresponding to the comparing unit 4, is supplied with the correcting address from the interruption generating address register 21, monitors the execution address of the address bus 16 and generates the coincidence signal 5 when the execution address coincides with the correcting address. The coincidence signal 5 is supplied to an interruption control circuit 25 through a switch 24. It will be appreciated, however, that the switch 24 can represent a process step of checking the flag in a control flag latch 23a before supplying the coincidence signal to the interruption control circuit 25.

The control flag latch 23a indicates whether or not a defective portion exists within the ROM 15. The control flag latch 23a is set to "1" in response to the input of the correcting information 7 and reset to "0" when the correcting information 7 is not input. When the control flag latch 23a is "0", the switch 24 is opened, while when the control flag latch 23a becomes "1", the switch 24 is closed and hence the coincidence signal 5 is input to the interruption control circuit 25 as an interruption request signal and the control by the CPU 14 is moved to the address shown by an interruption vector register 23b by the interruption processing in the interruption control circuit 25.

Let it be assumed that a leading address of the correcting content stored in the RAM 26 is latched in the interruption vector register 23b when the correcting information is written. Further, the control flag latch 23a, the interruption vector register 23b, the switch 24 and the interruption control circuit 25 correspond to the access altering unit 6 of FIG. 1.

The end of the correcting content stored in the RAM 26 is allocated to a jump instruction of the address in which the defective portion of the ROM 15, for example, is skipped so that the control is returned from the RAM 26 to the ROM 15. In this case, the reason that the processing is returned from the interruption processing by a jump instruction and not by a return instruction is to skip the defective portion within the RAM 15. Further, in association therewith, the data saved to the stack or the like upon interruption must be abolished or the like.

Figure 3A:
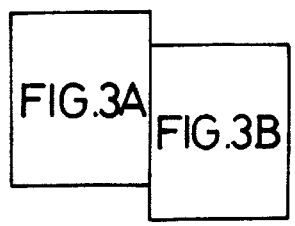
FIG. 3, which is formed of FIGS. 3A and 3B drawn on two sheets of drawings so as to permit the use of a suitably large scale, is a flowchart to which references will be made in explaining the operation of the first embodiment shown in FIG. 2.
Figure 3A:
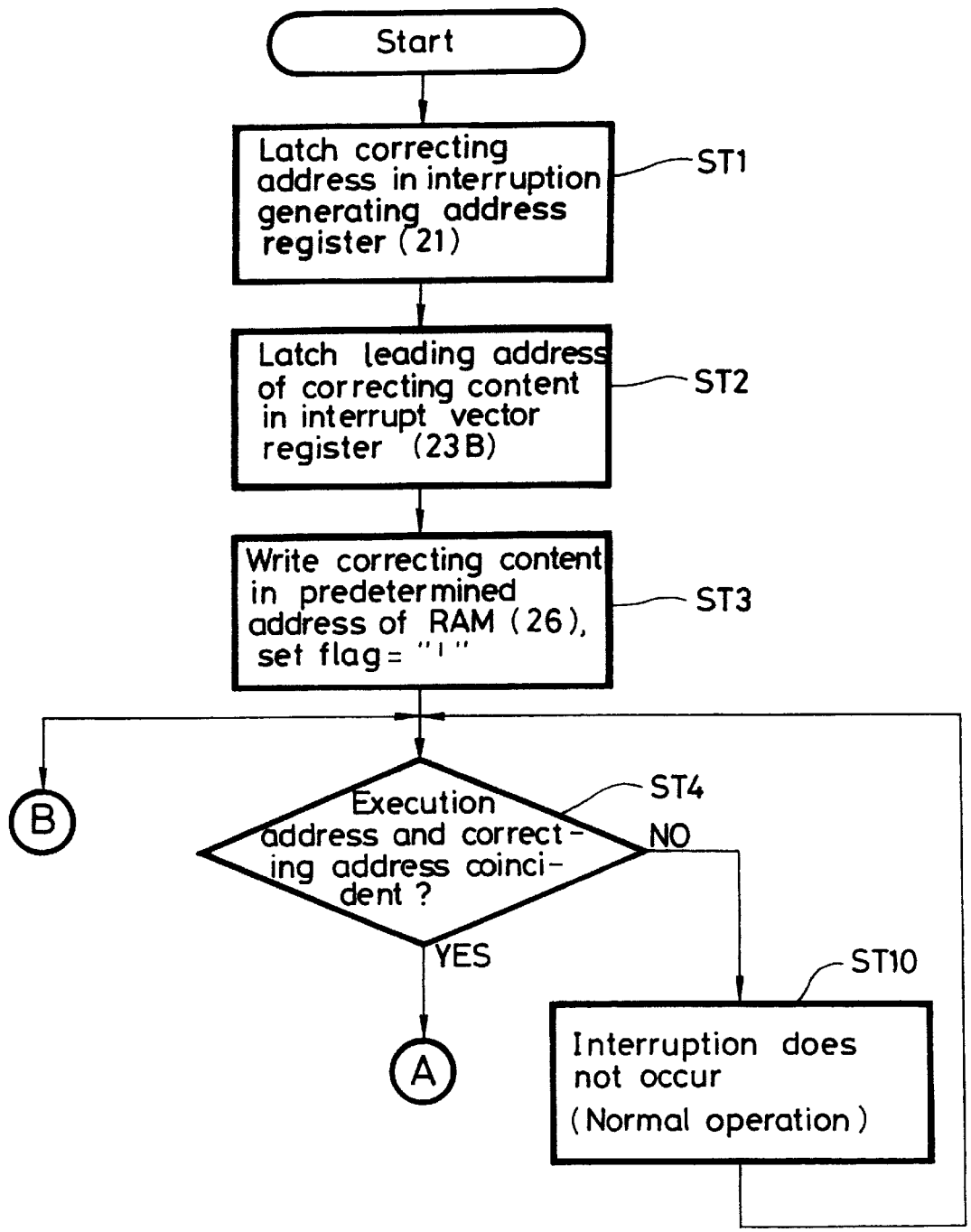
Figure 3B:
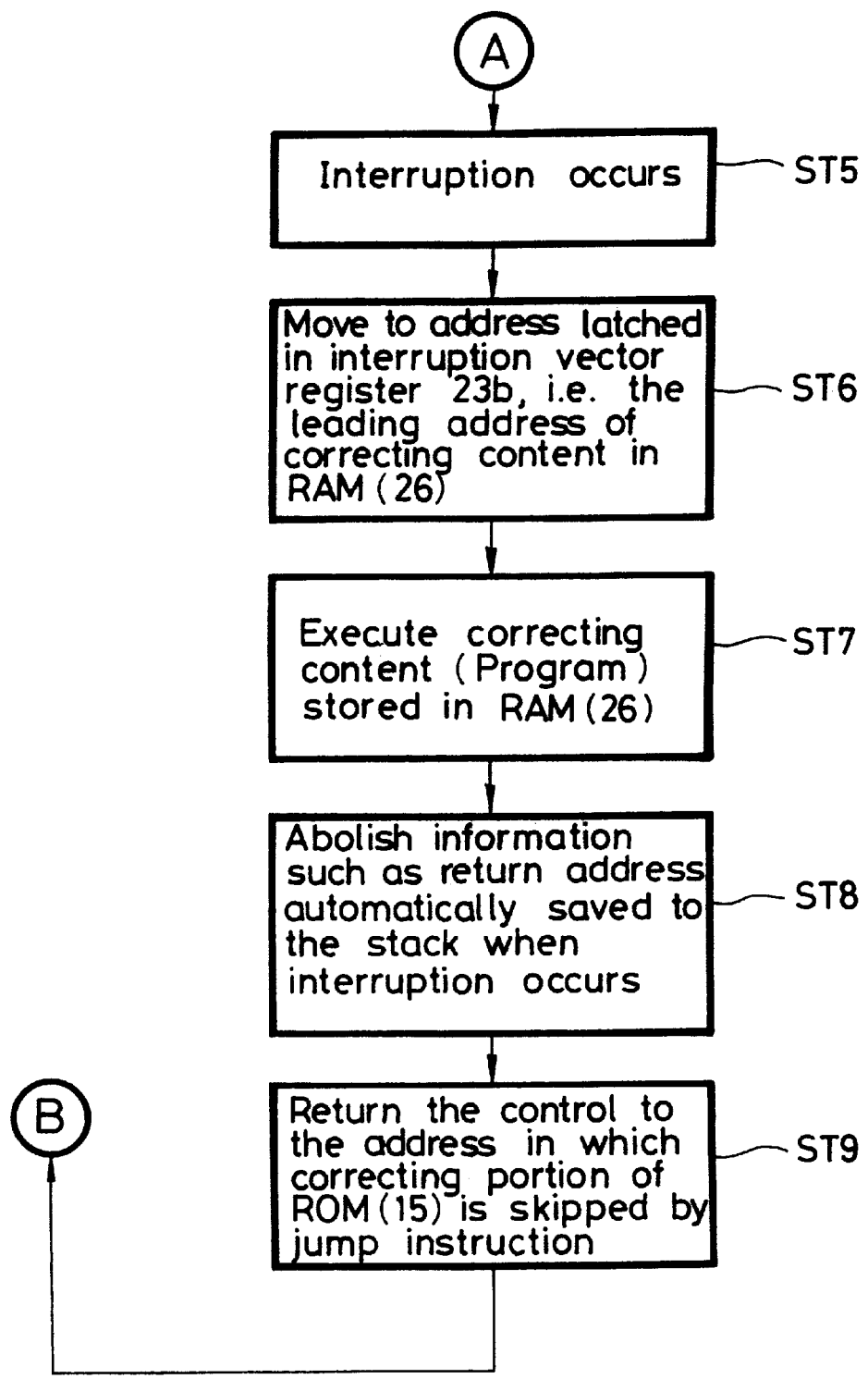

Referring to FIG. 3, which is formed of FIGS. 3A and 3B, a flowchart illustrates the operation of this embodiment. Upon initialization after the electronics apparatus is powered, using the correcting information stored in the EEPROM 27, the correcting address is latched in the interruption generating address register 21 by the initial patch loader stored in the ROM 15 at step ST1. The leading address of the correcting content is latched in the interrupt vector register 23b in step ST2. Further, the correcting content is written in a predetermined address of the RAM 26 and the control flag latch 23a is set to "1" at step ST3.

In the next decision step ST4, it is determined by the 16-bit comparator 22 whether the execution address output to the address bus 16 and the correcting address latched in the interruption generating address register 21 are coincident with each other. If the two addresses are not coincident as represented by a NO at decision step ST4, then the processing proceeds to step ST10 whereat an interruption does not occur and the access to the ROM 15 is carried out.

If the two addresses are coincident with each other as represented by a YES at decision step ST4, then the processing proceeds to step ST5, whereat the coincidence signal 5 is supplied to the interruption control circuit 25 from the comparator 22 through the switch 24 if the control flag ="1", and the interruption occurs. When the interruption occurs, the control is moved to the address latched in the interruption vector register 23b, i.e., the leading address of the correcting content in the RAM 26 in step ST6, and then the correcting content (program) stored in the RAM 26 is executed at step ST7.

When the return of the processing from the interruption is carried out not by the return instruction but by the jump instruction, an instruction for abolishing the return address or the like saved to the stack or the like is located at the end of the correcting content so that this abolishing instruction is executed in step ST8.

Finally, the jump instruction written in the correcting program is executed and the control is returned to the address in which the defective portion of the ROM 15 is skipped (in step ST9). In order to cope with the access made again to the defective portion, the comparator 22 continuously compares the addresses (step ST4).

When the ROM 15 has a plurality of defective portions, the step ST7 in the above-mentioned flowchart would further include updating the interruption generating address register 21 and the interruption vector register 23b to the next correcting address and the leading address of the next correcting content, respectively.

Further, referring to FIG. 2, in actual practice the switch 24 is removed and operation of the comparator 22 is turned on and off by the control flag latch 23a. Further, the control flag latch 23a and the switch 24 are removed and an invalid address is latched to the interruption generating address register 21 when the ROM 15 has no defective portion.

Furthermore, in FIG. 2, the EEPROM 27 is provided in the inside of the electronics apparatus 1 and an EEPROM writing device is connected to the communication line 28 to write the correcting information in the EEPROM 27, whereby the correcting information is constantly set in the rewritable condition within the inside of the electronics apparatus 1.

Figure 4:
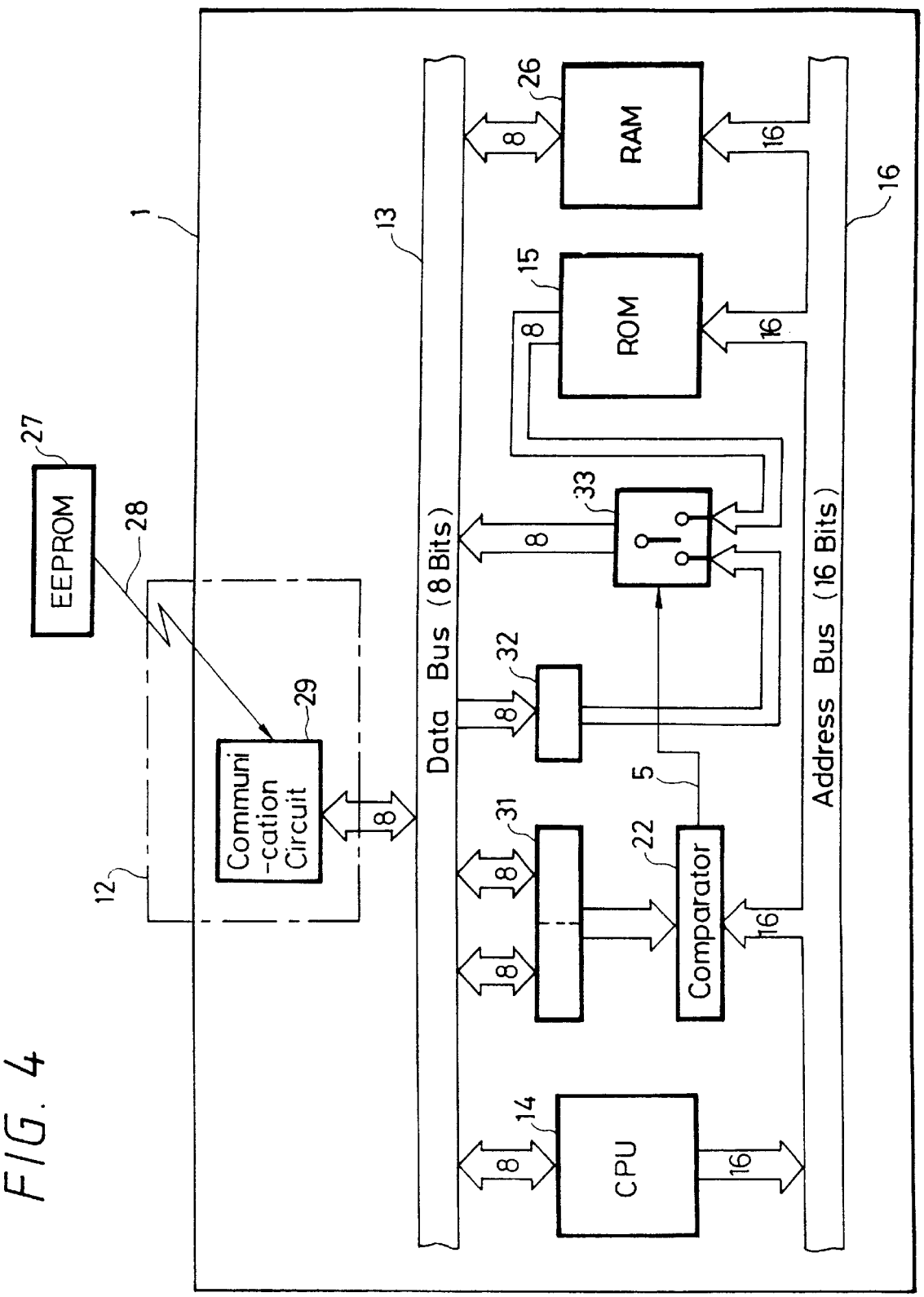
FIG. 4 is a block diagram showing the electronics apparatus according to a second embodiment of the present invention.

FIG. 4 shows in block form a second embodiment of the present invention. In FIG. 4, like parts corresponding to those of FIG. 2 are marked with the same references and therefore need not be described in detail.

Referring to FIG. 4, there is provided a correcting address register 31 which temporarily stores an address of one word to be corrected, i.e., the correcting address on the ROM 15. The correcting address register 31 corresponds to the correcting address storage unit 3 in FIG. 1. There is shown a correcting data register 32 which temporarily stores correcting data of one word and which corresponds to the correcting content storage unit 2 of FIG. 1. Further, a switch 33 switches the output of data from the ROM 15 to the data bus 13 or the output of the correcting data from the correcting data register 32 to the data bus 13. The switch 33 corresponds to the access altering unit 6 in FIG. 1.

Also in this embodiment, the patching of the arbitrary one word (one word might be either a program or data) stored in the ROM 15 by the correcting data of one word will be described with reference to a flowchart forming FIG. 5.

When the electronics apparatus 1 is initialized, the correcting information 7 read out from the EEPROM 27 is stored by an initial patch loader which resides in the ROM 15. More specifically, the correcting address of 2 bytes is latched in the correcting address register 31 in step ST11 and correcting data of one byte is latched in the correcting data register 32 in step ST12.

After the electronics apparatus 1 is initialized, it is determined by the comparator 22 in the next decision step ST14 whether or not the execution address output to the address bus 16 and the correcting address stored in the correcting address register 31 are coincident with each other.

If the execution address and the correcting address are not coincident with each other as represented by a NO at decision step ST14, then the processing proceeds to step ST20, whereat the switch 33 is switched to the ROM 15 side. In the next step ST21, as the accessing result of the CPU 14 to the ROM 15, data stored in the ROM 15 is output to the data bus 13.

If the execution address and the correcting address are coincident with each other as represented by a YES at decision step ST14, then the processing proceeds to step ST15, whereat the switch 33 is switched to the correcting data register 33 side. Therefore, as a result of the access to the ROM 15 by the CPU 14, the correcting data latched in the correcting data register 32 is output to the data bus 13 in step ST16. In order to prepare for the next correction, the comparator 22 continues the comparison of addresses in step ST14.

Figure 5:
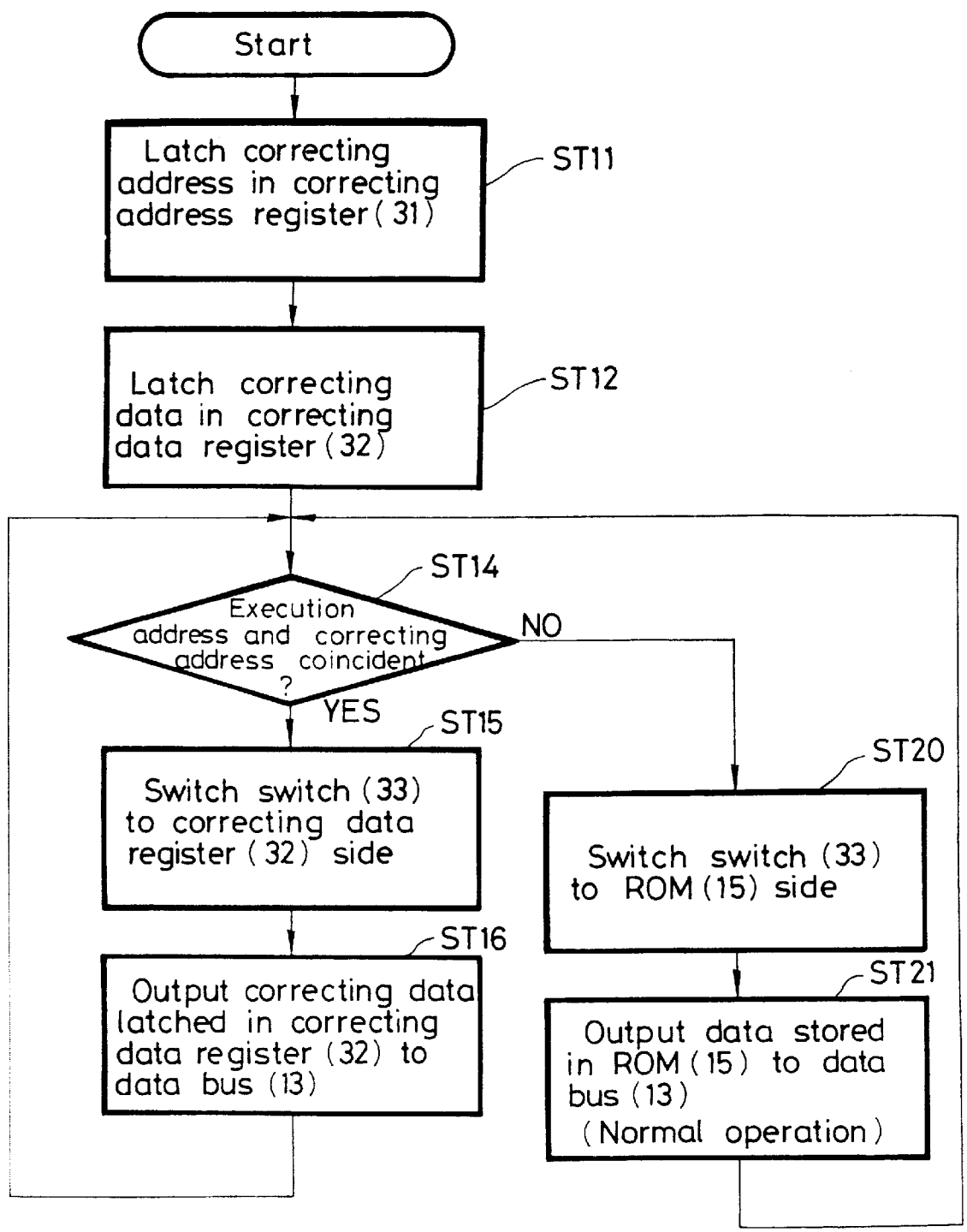
FIG. 5 is a flowchart to which references will be made in explaining the operation of the second embodiment shown in FIG. 4.
Figures 6A, 6B:
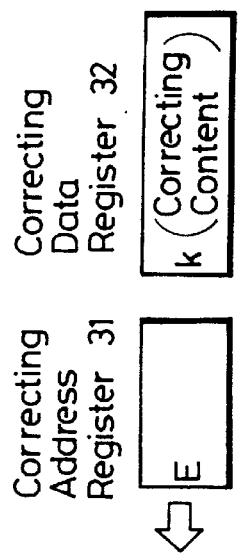
FIGS. 6A and 6B are, respectively, schematic diagrams showing an example of the operation of the second embodiment shown in FIG. 4.

FIGS. 6A and 6B are schematic diagrams showing examples of the operation shown in the flowchart of FIG. 5.

FIG. 6A shows addresses and contents of the ROM 15 and contents of the correcting address register 31 and the correcting data register 32. Data a to h are respectively stored in addresses A to H of the ROM 15 in a fixed fashion. In this case, let it be assumed that the data e at the address E is erroneous. Then, the correcting address E and the correcting data k are respectively latched in the correcting address register 31 and the correcting data register 32.

FIG. 6B shows an execution image (a program) or a reference image (data) wherein the addresses A to H of the ROM 15 are sequentially accessed by the CPU 14 according to this embodiment. That is, the erroneous portion e is substituted by the correcting content k and hence corrected.

Figure 7A:
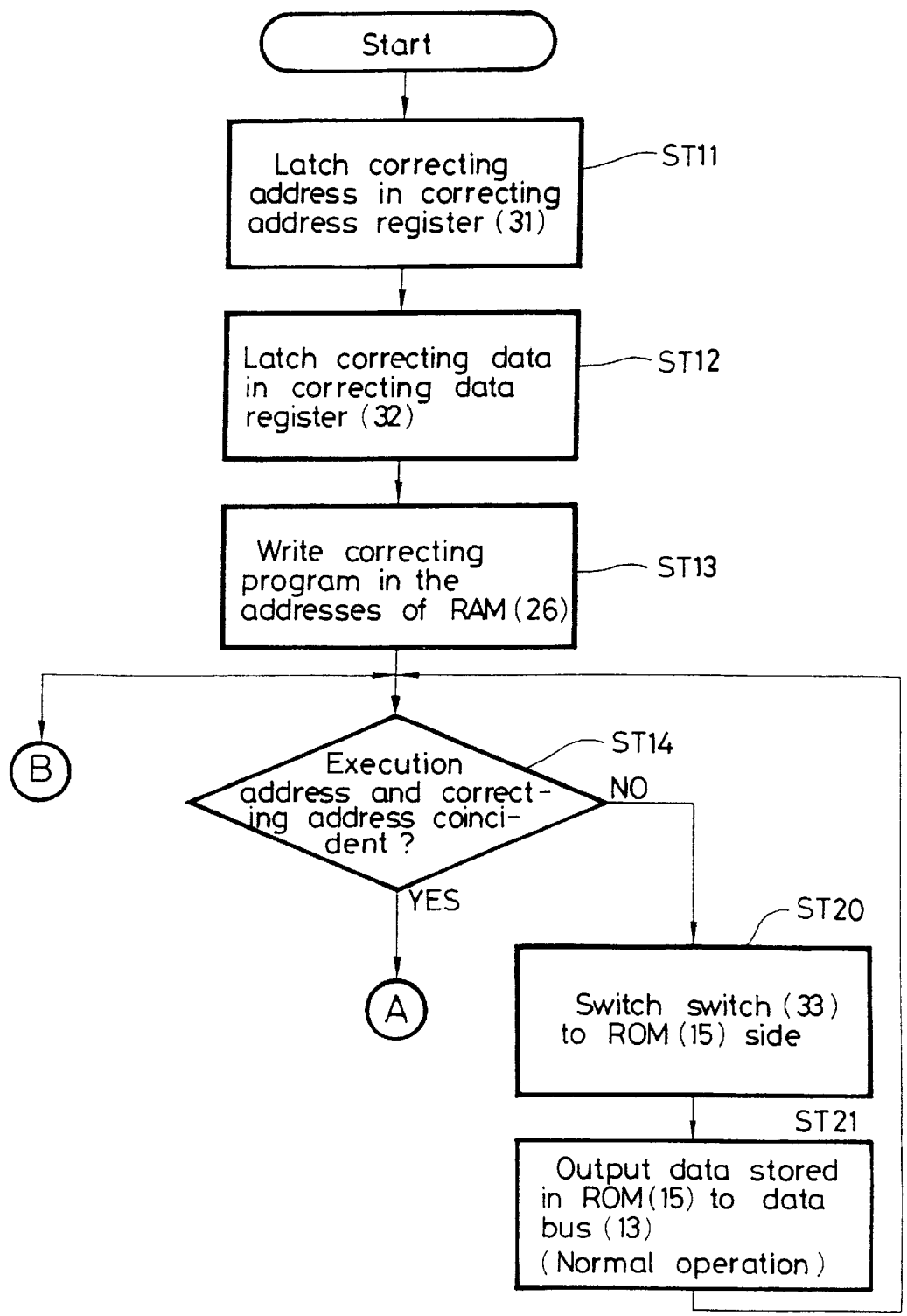
FIG. 7, which is formed of FIGS. 7A and 7B drawn on two sheets of drawings so as to permit the use of a suitably large scale, is a flowchart to which references will be made in explaining another example of the operation of the second embodiment shown in FIG. 4.
Figure 7B:
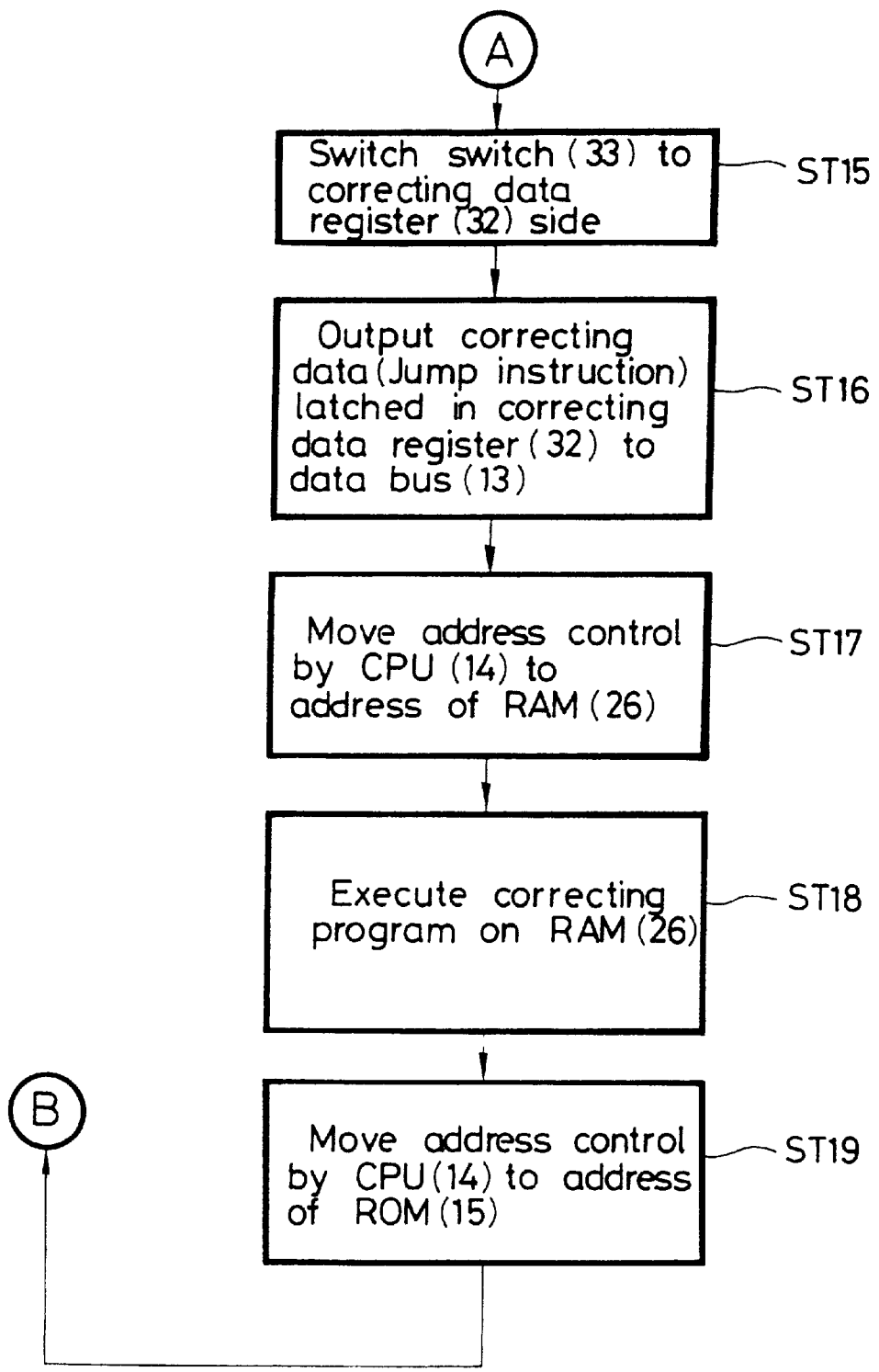

Referring to FIG. 7, which is formed of FIGS. 7A and 7B, a flowchart illustrates an operation wherein a plurality of erroneous portions, e.g., each of one word of two erroneous portions is corrected according to the second embodiment of the present invention. FIGS. 8A, 8B and 8C are schematic diagrams used to explain the example of operation of the second embodiment. The flowchart forming FIG. 7 is substantially the same as that of FIG. 5 except for four steps ST13 and ST17 to ST19 and overlapping steps to those of FIG. 5 need not be described in detail.

The operation in which the addresses B and E of the ROM 15 are corrected as shown in FIGS. 8A and 8B will now be described. Referring to FIG. 7, following the Start of operation, the correcting address B is latched in the correcting address register 31 at step ST11. In the next step ST12, a one word instruction "jump to L" is latched in the correcting data register 32 as correcting data in this embodiment. In the next step ST13, data shown in FIG. 8B are written in addresses L to S of the RAM 26.

If the execution address and the correcting address B are coincident with each other as represented by a YES at the next decision step S14, the one word correcting data "jump to L" latched in the correcting data register 32 is output to the data bus 13 at step ST16, and the address control by the CPU 14 is moved to the address L of the RAM 26 at step ST17.

After data "correcting content at B" of the address L of the RAM 26 is executed, data "write leading address E of the next correcting portion in correcting address register (31)" at its address M and data "write instruction indicative of Jump to 'P' in correcting data register (32)" at its address N are executed sequentially at step ST18. As a consequence, the correcting address E is latched in the correcting address register 31 and correcting data "jump to P" is latched in the correcting data register 32.

Data "jump to C" at the address O of the RAM 26 is executed and the address control by the CPU 14 is moved to the address C of the ROM 15 in step ST19.

The patching of the first erroneous portion b is now completed and steps ST14 to ST19 or ST14 to ST21 are repeated.

More specifically, in the address E of the ROM 15, the address control of the CPU 14 is moved to the address P of the RAM 26 where the second erroneous portion e is corrected. In response to the instructions written in the addresses Q and R of the RAM 26, the correcting address B and the correcting data "jump to L" are respectively latched in the correcting address register 31 and the correcting data register 32 one more time for thereby preparing again for the correction of the first erroneous portion b. Lastly, the instruction "Jump to F" is executed to return the address control of the CPU 14 to the remaining series of addresses F and G in the ROM 15. FIG. 8C shows an execution image according to this example.

In FIG. 8B, "correcting content" shown on each of the addresses L, P of the RAM 26 is not limited to one word. In other words, the correcting content for each of one word error portions b and e might be formed of a plurality of words.

According to the second embodiment shown in FIG. 4, a plurality of defective portions can be corrected by preparing a plurality of sets of the comparator 22, the correcting address register 31 and the correcting data register 32.

According to the present invention, when the bug in the firmware is discovered after the mass-production or when the firmware is varied, the electronics apparatus of the present invention can cope with such case rapidly and easily by supplying the correcting information thereto from the outside.

In all embodiments of the present invention the correcting information storage means 100 and the switching means 200 are unitarily integrated on the same semiconductor substrate.

Furthermore, according to the present invention, the addition of an external circuit such as those modifications requiring much expense, a lot of time and many experts is not needed and also the modifications when electronics apparatus are again mass-produced are not needed unlike the prior art. Simultaneously, the electronics apparatus can be prevented from being deteriorated in reliability due to the addition of external circuits or the like.

Having described the preferred embodiments of the invention with reference to the accompanying drawings, it is to be understood that the invention is not limited to those precise embodiments and that various changes and modifications thereof could be effected by one skilled in the art without departing from the spirit or scope of the invention as defined in the appended claims.

What is claimed is:

1. A micro-controller integrated on a single substrate and in which a read-only information storage means for storing firmware, address control means for performing address control and input means for inputting information supplied thereto from a source external to the substrate, the micro-controller comprising:

random access correcting information storage means located on the single substrate for receiving correcting information input thereto from the source external to the substrate through the input means and storing the correcting information upon any initialization of the micro-controller, wherein the correcting information is indicative of modifications for all defective information parts stored in the read-only information storage means, and switching means located on the single substrate for selectively switching the access by the address control means from the defective information part in the read-only information storage means to the correcting information in the correcting information storage means, wherein the correcting information includes a correcting address, which is the same as an address of a defective information part in the read-only information storage means, and modifying information to replace the defective information part, the switching means comprises address comparing means for comparing an address to be accessed by the address control means and the correcting address and outputting an address coincidence signal when the correcting address and the address to be accessed by the address control means are the same, and access altering means connected to the address comparing means for causing the address control means to access the modifying information in the correcting information storage means instead of the defective information part in the read-only information storage means in response to the address coincidence signal, wherein the correcting information storage means comprises modifying information storing means for storing the modifying information and a correcting address storing means for storing the correcting address, wherein the access altering means comprises a control flag latch which is set to indicate that the read-only information storage means stores a defective information part, an interruption vector register for storing a leading address of the modifying information in the random access memory, an interruption control circuit responsive to the address coincidence signal as an interruption request signal for causing control by the address control means to move to the leading address in the interruption vector register by interruption processing, and means for gating the address coincidence signal to the interruption control circuit only when the control flag latch is set to indicate that there is a defective information part in the read-only information storage means.

* * * * *